US006984953B2

(12) United States Patent
Quirion et al.

(10) Patent No.: US 6,984,953 B2
(45) Date of Patent: Jan. 10, 2006

(54) METHOD AND APPARATUS FOR RECONSTRUCTING MOTOR CURRENT FROM DC BUS CURRENT

(75) Inventors: Jean Quirion, Timberlea (CA); Laird Bolt, Halifax (CA)

(73) Assignee: International Rectifier Corporation, El Segundo, CA (US)

( * ) Notice: Subject to any disclaimer, the term of this patent is extended or adjusted under 35 U.S.C. 154(b) by 75 days.

(21) Appl. No.: 10/761,482

(22) Filed: Jan. 20, 2004

(65) Prior Publication Data

US 2004/0195995 A1 Oct. 7, 2004

Related U.S. Application Data

(60) Provisional application No. 60/441,370, filed on Jan. 20, 2003.

(51) Int. Cl.
*G05B 11/28* (2006.01)

(52) U.S. Cl. ...................... 318/599; 318/254; 318/439; 318/138; 318/811; 363/37; 363/39; 363/74

(58) Field of Classification Search ........ 318/432–434, 318/599, 811, 254, 800; 363/39, 37, 74
See application file for complete search history.

(56) References Cited

U.S. PATENT DOCUMENTS

| | | | | |
|---|---|---|---|---|
| 4,757,435 | A * | 7/1988 | Wood et al. | 363/54 |
| 5,483,140 | A * | 1/1996 | Hess et al. | 318/802 |
| 5,642,273 | A * | 6/1997 | Lai et al. | 363/56.12 |
| 5,949,664 | A * | 9/1999 | Bernet et al. | 363/37 |
| 5,959,431 | A * | 9/1999 | Xiang | 318/811 |
| 6,462,974 | B1 * | 10/2002 | Jadric | 363/127 |
| 6,839,249 | B2 * | 1/2005 | Kalman et al. | 363/35 |

* cited by examiner

*Primary Examiner*—Rina Duda
(74) *Attorney, Agent, or Firm*—Ostrolenk, Faber, Gerb & Soffen, LLP

(57) ABSTRACT

In a PWM space vector modulation inverter motor drive system, PWM cycles are modified to permit motor phase currents to be reconstructed as observable on the DC bus link. The PWM cycles are modified near sector boundaries so that measurements taken at the DC bus link correspond to actual motor phase currents. With this technique, a single DC bus current measure can be used to reconstruct all motor phase currents, while also providing fault protection.

14 Claims, 11 Drawing Sheets

FIG.1 PRIOR ART
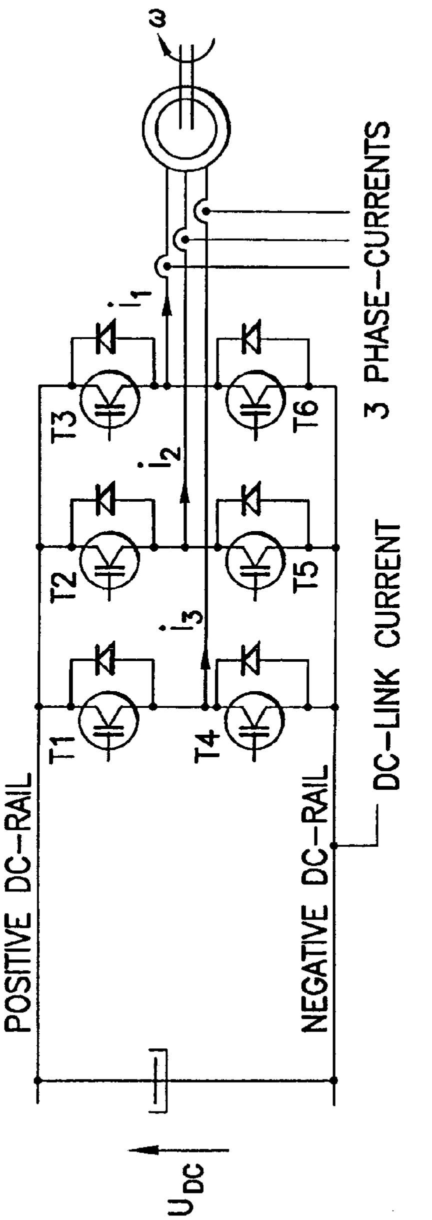
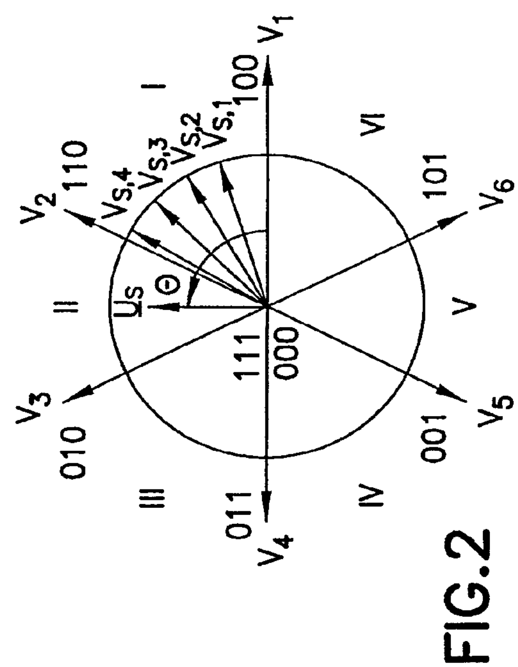
FIG.2 PRIOR ART

RELATIONSHIP BETWEEN VOLTAGE VECTOR, DC-LINK CURRENT AND ACTUAL PHASE-CURRENT

| VOLTAGE VECTOR | DC-LINK CURRENT $i_{DC}$ |
|---|---|
| $\underline{U}_S$=(100) | $+ i_1$ |
| $\underline{U}_S$=(110) | $- i_3$ |
| $\underline{U}_S$=(010) | $+ i_2$ |
| $\underline{U}_S$=(011) | $- i_1$ |
| $\underline{U}_S$=(001) | $+ i_3$ |
| $\underline{U}_S$=(101) | $- i_2$ |
| $\underline{U}_S$=(000)=(111) | 0 |

METHOD AND APPARATUS FOR RECONSTRUCTING MOTOR CURRENT FROM DC BUS CURRENT

RELATED APPLICATION

This application is based on and claims benefit of U.S. Provisional Application No. 60/441,370, filed Jan. 20, 2003, entitled Method and Apparatus for Reconstructing Motor Current from DC Bus Current, to which a claim of priority is hereby made.

BACKGROUND OF THE INVENTION

1. Field of the Invention

The present invention relates generally to motor current feedback detection, and relates more particularly to reconstructing motor currents from DC bus currents.

2. Description of Related Art

Motor drives that switch DC power to control single or multiple phase motors are well known. A typical application involves switching DC bus current or power to different phases of a three phase AC motor. In controlling the AC motor, it is desirable to accurately measure motor phase current over a wide range of operating parameters.

It is known to measure motor phase current through current transformers or Hall effect sensors that are directly coupled to the motor phase lines that carry the current between the switches and the motor. However, these current sensors are typically large and costly, often making up a large percentage of the overall cost of the motor drive. In addition, the sensors are susceptible to non-linear operation and variations over time and with changing environmental properties, such as temperature. It would be desirable to obtain a measure of the motor phase currents without having to measure the current of each phase individually.

A popular control technique for controlling switching of the motor drive involves the use of space vector modulation. In space vector modulation, a rotating vector represents the motor shaft angle. The rotating vector is broken down into component vectors that represent individual switching states for controlling current to the motor. In this type of motor control, it is possible to measure motor phase current by measuring the DC bus current when non-zero basic vectors are used in the space vector modulation. FIG. 1 shows a pulse width modulated (PWM) inverter drive system, in which each basic vector is assigned a specific time in a PWM cycle to generate a command voltage vector. A space vector diagram is illustrated in FIG. 2, showing the various switching states and quadrants for space vector control. Each switching state represents ON and OFF switch conditions for each pole of the inverter A, B and C. For example, FIG. 3 illustrates the switch conditions for state [100] according to the vector VI of the space vector diagram.

Referring now to FIG. 4, the shaded areas of the space vector diagram illustrate non-observable regions near the sector borders, with the corresponding PWM waveforms. FIG. 5 illustrates non-observable regions in the case of a low modulation index, with the corresponding PWM signals. There are two zero vectors not illustrated in the above diagrams, which can be viewed in the abstract as coming out of the center of the vector diagram or going into the page, as illustrated in FIG. 2. With a PWM induction motor drive, the six active inverter states have a DC link current that is directly related to the current in one of the motor lines. In the zero vector state, the DC link current disappears because all motor currents are free wheeling within the inverter. The voltage vector and related DC link currents are illustrated in FIG. 6.

When switching between sector boundaries, it is difficult to determine the motor phase current because of the brief interval of the switching state, as illustrated by the shaded areas in FIG. 4. The lack of observability of the motor phase current in these boundary conditions reduces the capacity of the dynamic control of the motor, and prevents proper reconstruction of the motor phase currents. It would be desirable to improve the observability of motor phase currents in the boundary areas, while reducing the requirements of current sensors used to measure motor current.

SUMMARY OF THE INVENTION

In accordance with the present invention, there is provided a method for reconstructing an electrical AC motor phase current by measuring DC bus current. Motor phase currents are reconstructed by measuring the DC bus current in the DC bus feeding a switching DC-AC converter. The PWM value is modified near the sector boundaries in the space vector modulation control, so that the desired result in voltage vector has an average of two or more vectors. The two vectors are chosen such that the current can be measured and the phase currents reconstructed.

Advantageously, the present invention provides a technique to handle the sector boundary problem when using a single shunt current sense resistor. The inventive technique may also be used to improve drive operation at the sector boundaries, regardless of the current sense technique used.

By modifying PWM cycles, an appropriate current is delivered to the motor, while the DC bus link current sensor can accurately measure the appropriate motor phase current.

BRIEF DESCRIPTION OF THE DRAWINGS

The present invention is described in greater detail below, with reference to the accompanying drawings, in which:

FIG. 1 shows a conventional inverter drive;

FIG. 2 shows a state vector diagram;

DETAILED DESCRIPTION OF THE PREFERRED EMBODIMENTS

Figure 7:
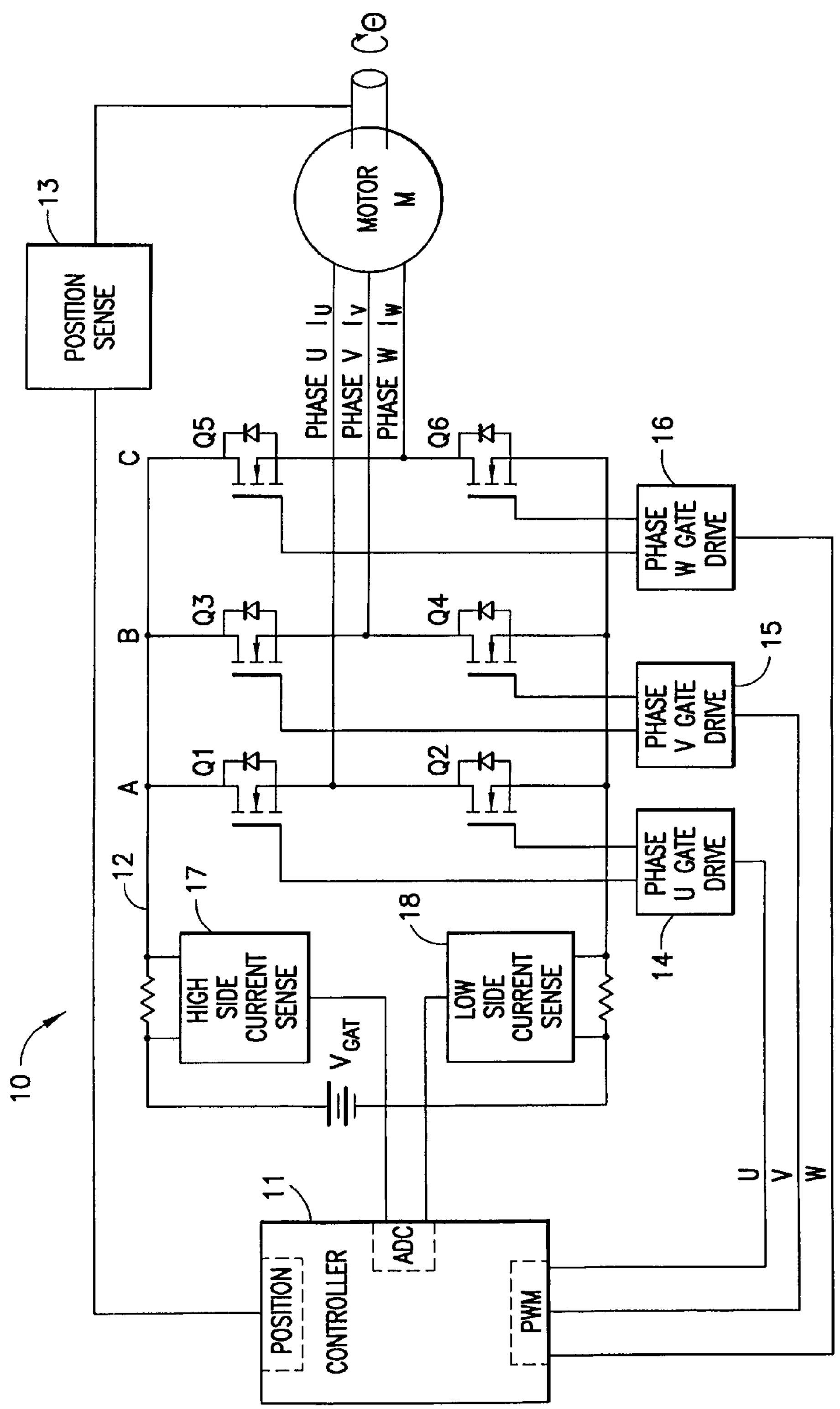
FIG. 7 is a circuit block diagram of an inverter drive system according to the present invention.

Referring now to FIG. 7, a motor drive system according to the present invention is illustrated generally as system 10. System 10 includes an inverter 12 with MOSgated switches for directing current to motor M. Inverter 12 is composed of switches Q1–Q6, that are driven in complementary pairs.

Thus, Q1 and Q2 in pole A are switched on and off as each other's complement, as are switches Q3 and Q4 in pole B, and switches Q5 and Q6 in pole C. That is, when switch Q1 is switched on, switch Q2 is switched off, and vice versa, and similarly for switches Q3 and Q4 and switches Q5 and Q6. This switching scheme avoids current shoot through which can occur when a pair of complementary switches are on at the same time. When switches Q1 and Q2 change states, for example, a certain amount of dead time is inserted between switching gate signals to avoid current shoot through. This dead time, in addition to the turn on and turn off times for the switches, coupled with the time delay in reading the bus current, all contribute to increasing the non-observable time surrounding the sector boundaries of the state diagram. Gate drives 14–16 control switches Q1–Q6 to insert an appropriate dead time, and handle normal switching functions for the MOSgated switches.

In accordance with the present invention, a high or low side current sense device may be used on either the positive or negative side of the DC bus, respectively. Only one current sense device is needed to realize the present invention. The control signals supplied to gate drivers 14–16 are PWM signals U, V and W, which correspond to the waveforms in FIGS. 9–12 described below.

In motor driver system 10, controller 11 obtains feedback from position sensor 13, which may be an encoder or the like attached to the shaft of motor M. Controller 11 also receives feedback from one or more current sensors 17, 18, coupled to the high or low side DC bus. Controller 11 also generates PWM signals U, V and W used to signal gate drivers 14–16, which supply the appropriate signals to switches Q1–Q6. Switches Q1–Q6 in turn direct current through the different phases to produce currents IU, IV and IW supplied to motor M.

The present invention uses a single DC link current sensor, i.e., current sensor 17 or 18, to measure DC bus current and reconstruct motor phase currents IU, IV and IW. The difficulty in the reconstruction of the motor phase currents occurs near vector sector boundaries, i.e., every 60° in the vector state diagram. In accordance with the present invention, the PWM values are modified near the sector boundaries so that the resultant vector is produced as an average of two or more observable vectors. The two or more observable vectors are chosen so that the current can be measured by current sensors 17 or 18, permitting reconstruction of the motor phase currents. Current samples I1, I2, I3 and I4 are taken from bus current sensing device 17 or 18 to reconstruct motor phase currents IU, IV and IW.

Figure 8:
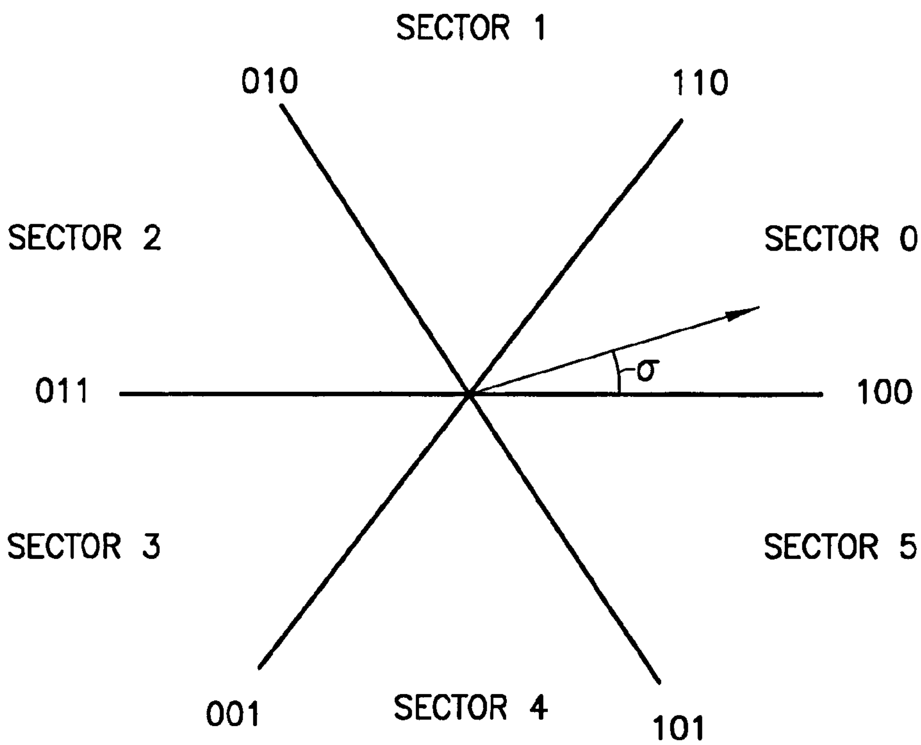
FIG. 8 shows a state diagram illustrating modification of PWM cycles to improve motor phase current observability.

Referring now to FIG. 8, the vector sector boundary problem occurs when $|\sigma|$MOD 60<$\alpha$.

Figure 3:
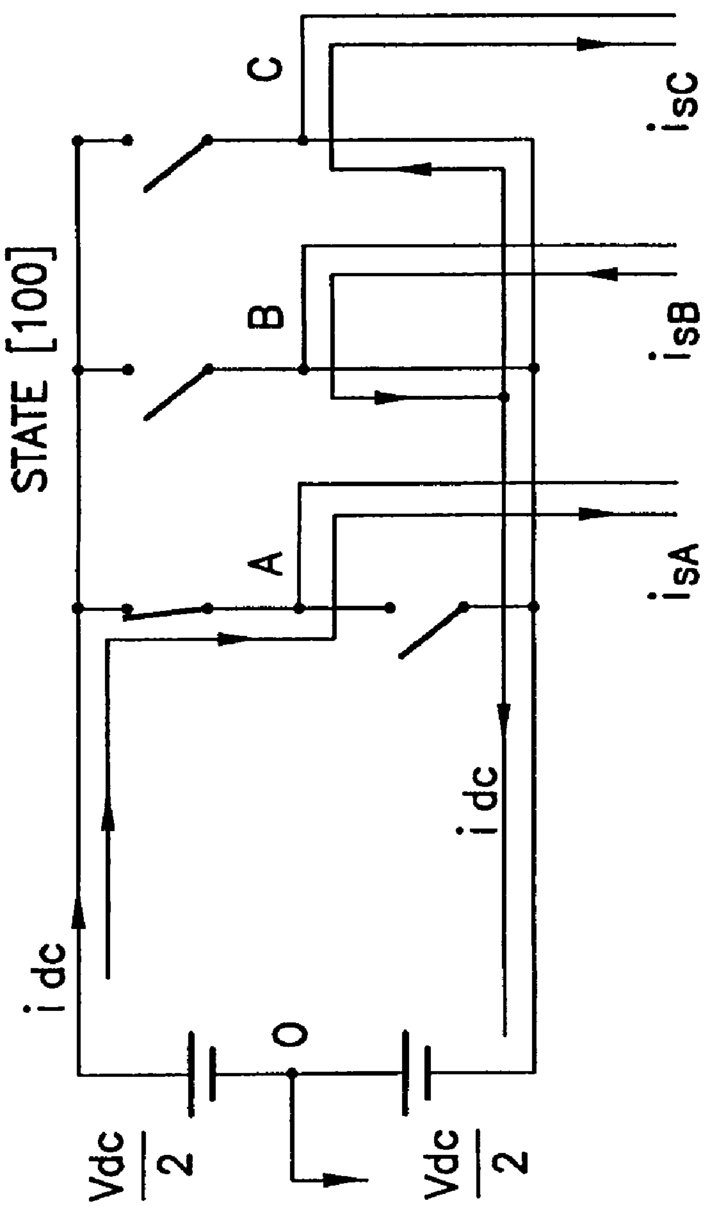
FIG. 3 shows an inverter switching state associated with a state vector.
Figure 4:
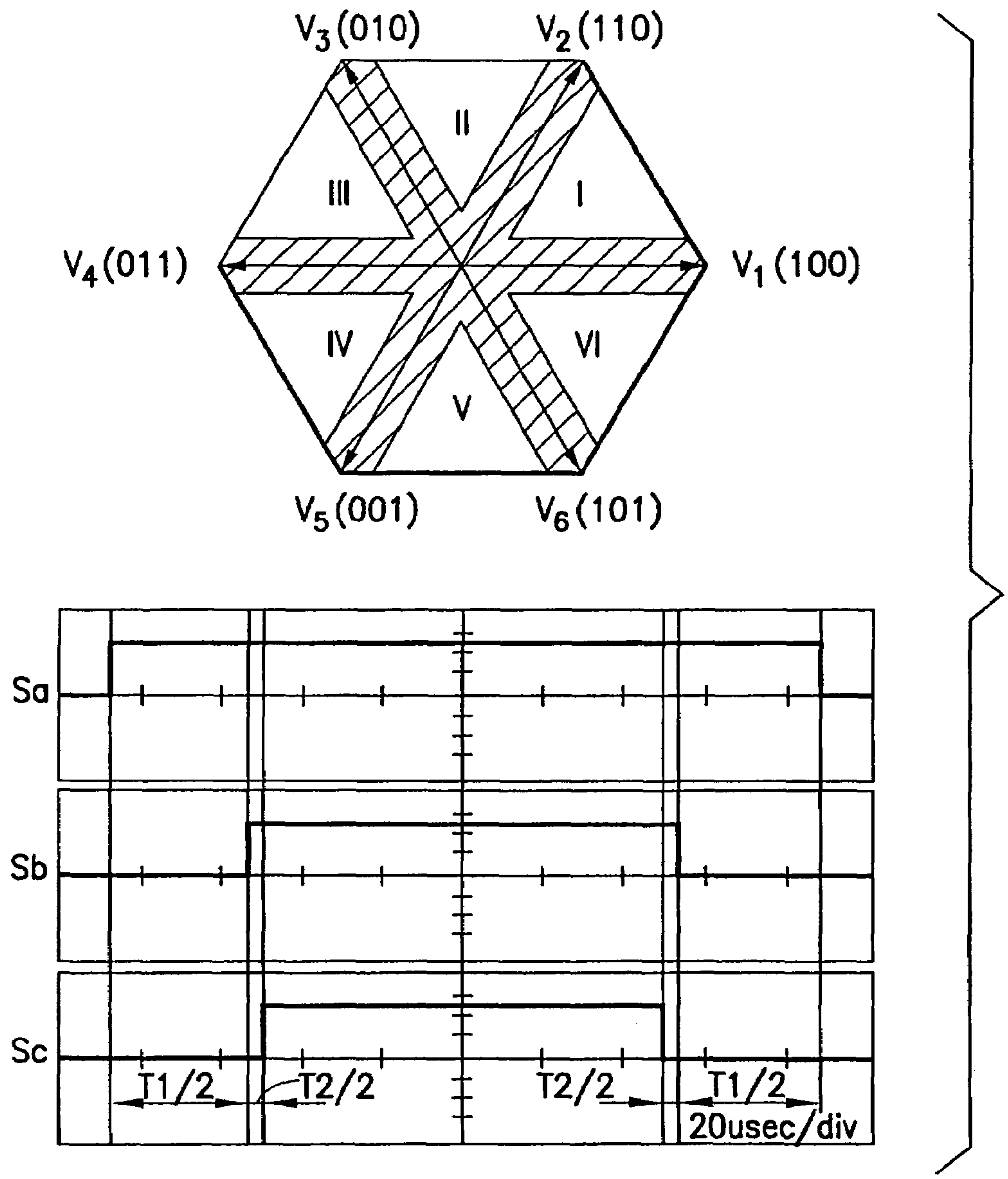
FIG. 4 shows a state diagram and gate signals illustrating non-observable areas near sector boundaries.
Figure 5:
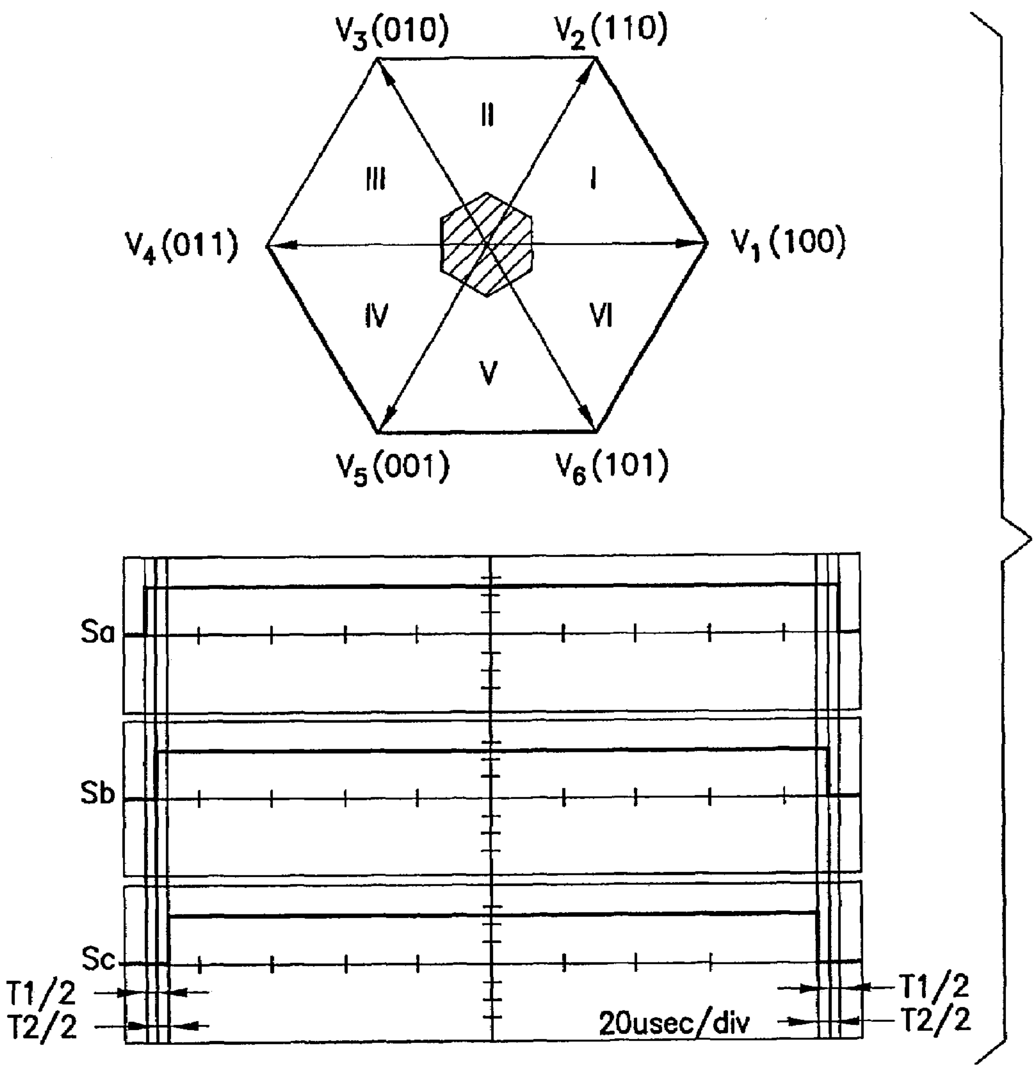
FIG. 5 shows a state diagram and gate signals illustrating non-observable areas with a low modulation index.
Figure 6:
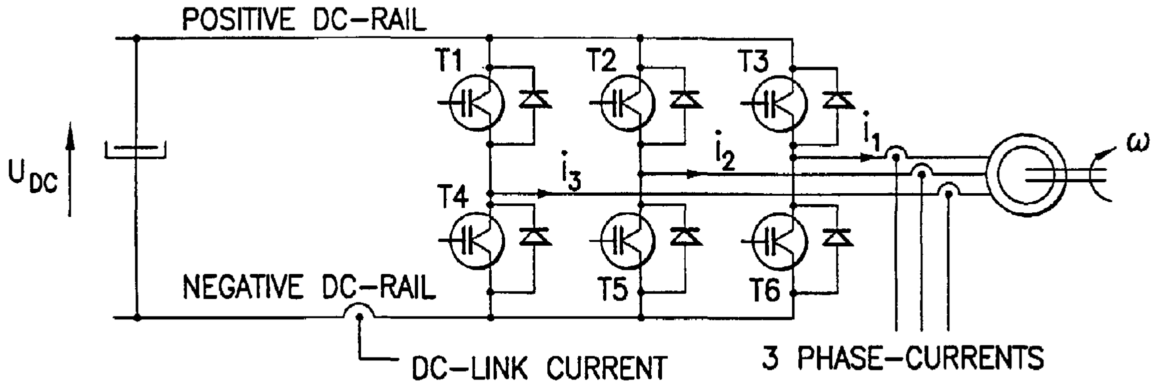
FIG. 6 shows an inverter motor drive system with DC link currents for various switching state vectors.

The value of $\alpha$ depends on the dead time compensation in the sector boundary encountered when the PWM cycles are adjusted. In FIG. 4, for example, sector boundaries 100, 110, 010, 011, 001 and 101 correspond to the 0-5, 0-1, 1-2, 2-3, 3-4 and 4-5 sector boundary transitions in FIG. 8. For the sake of illustration, the reconstruction of motor currents is shown for the 0-5 sector boundary.

Figure 9:
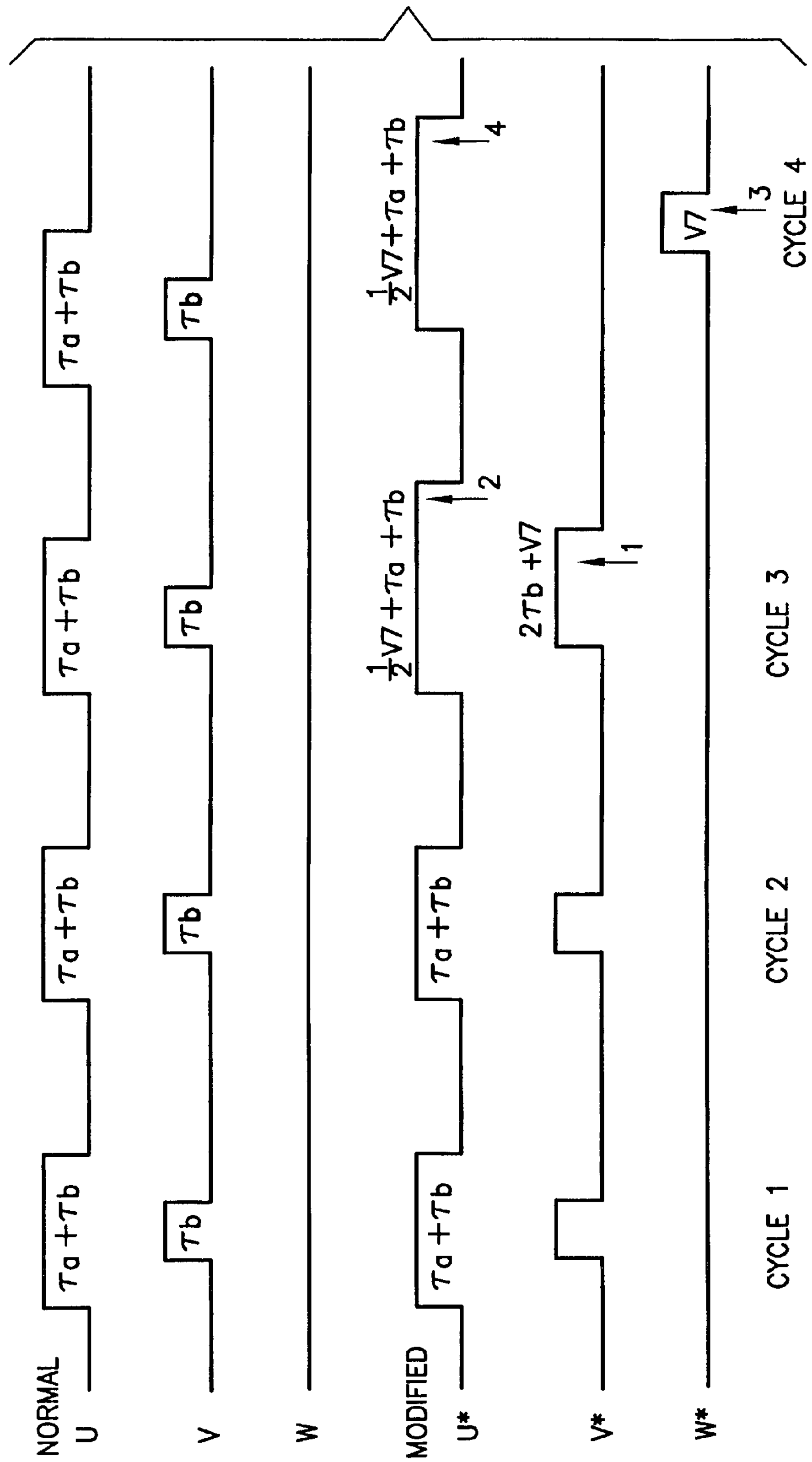
FIGS. 9–12 show timing diagrams for gate signals during different control sectors that are modified to obtain a DC bus current measurement to reconstruct motor phase currents according to the present invention.

Referring now to FIG. 9, a solution to the sector boundary problem is illustrated by the modification of two PWM cycles so that the current can be measured. In the sector 0-5 transition, similar to sector transitions 1-2 and 3-4 $\sigma$ is less than $\alpha$, i.e., near sector 0-5 boundary. In this situation, the current reconstruction is given by the following equations.

$$I_U=(I_2+I_4)/2$$

$$I_V=(-I_3+I_1-I_2)/2$$

$$I_W=(-I_1+I_3-I_4)/2 \quad (1)$$

PWM cycles 1 and 2 are optional, but cycles 3 and 4 occurs in pairs where current is sampled at times 1–4 as indicated in FIG. 9. Note the modifications to signals U, V and W during cycles 3 and 4 at points 1–4 in FIG. 9. The switching period for phase U is modified from τa+τb to ½ V7+τa+τb at points 2 and 4. Phase V is modified from τb to 2τb+V7 at point 1, and no pulse is delivered after the pulse at point 1. In phase W, where previously no pulse was provided, a pulse V7 at point 3 is supplied. Each of these modifications permits an extension of the PWM cycles to allow observability of the motor switching states in conjunction with the measured DC bus current. That is, samples taken at points 1–4 permits reconstruction of the motor phase current, which were not previously available in the unmodified PWM control.

Figure 10:
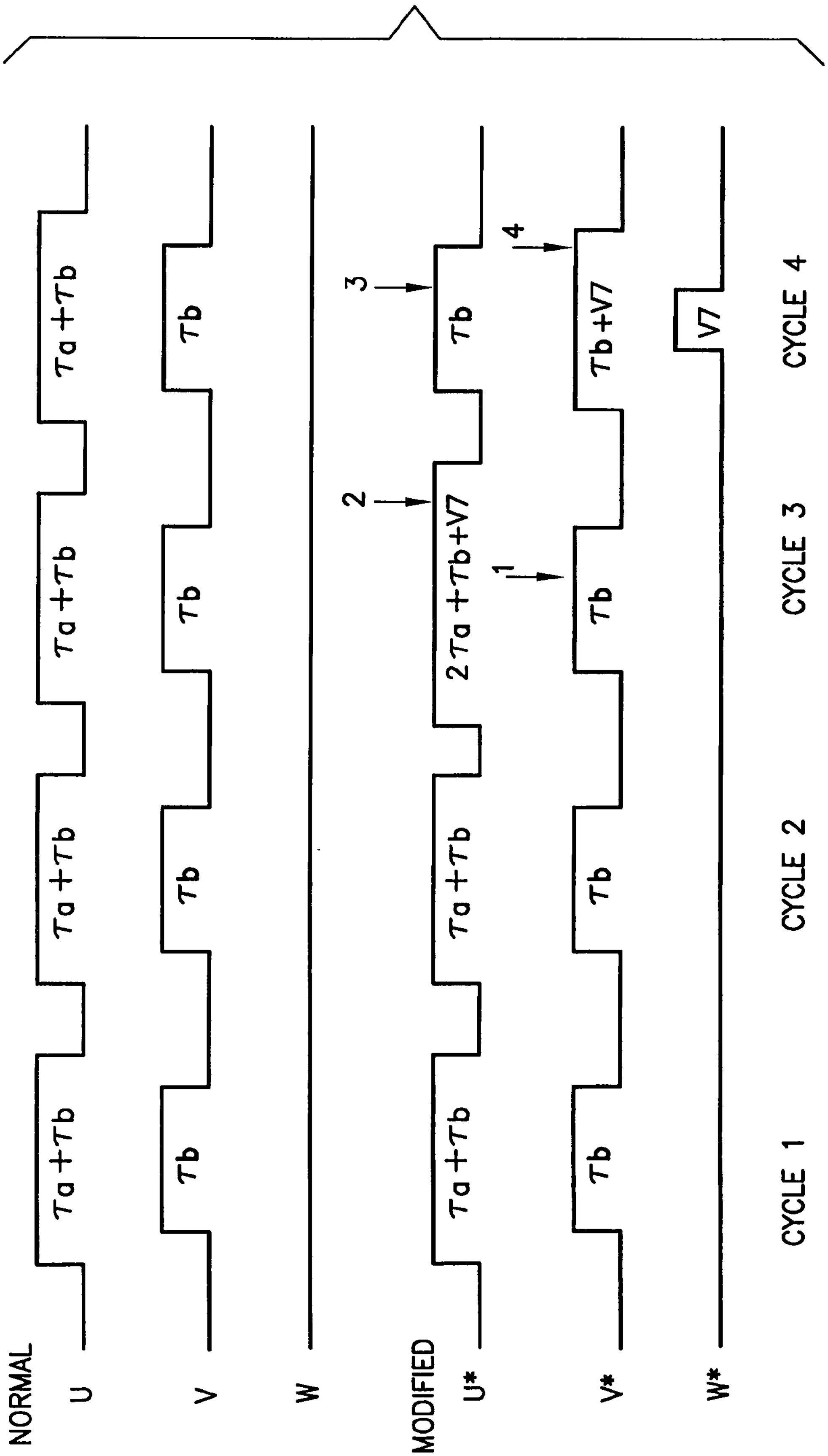

Referring now to FIG. 10, signal waveforms in sector zero where signal waveforms 60–$\beta$<$\sigma$<60 are shown. That is, near sector 0-1 boundary, the current reconstruction is obtained as the U, V and W signals are modified. The reconstructed motor phase currents are obtained according to the following equations.

$$I_U=(I_2+I_3-I_4)/2$$

$$I_V=(I_4+I_1-I_2)/2$$

$$I_W=(-I_1-I_3)/2 \quad (2)$$

Note the modifications to the PWM cycles shown in FIG. 10 for the 0-1 boundary transition. For example, phase U is modified from τa+τb to a period of 2τa+τb+V7 to obtain measuring point 2, and τb to obtain measuring point 3. Phase V is modified from τb to τb+V7 at point 4. A current measure can be taken to reconstruct phase V at point 1 as well, even though the same PWM waveform is available. Phase W is modified to include a pulse of V7 to offset the modifications to phases U and V while maintaining the appropriate phase vector control. Again, PWM cycles 1 and 2 are optional, while cycles 3 and 4 occur in pairs.

Figure 11:
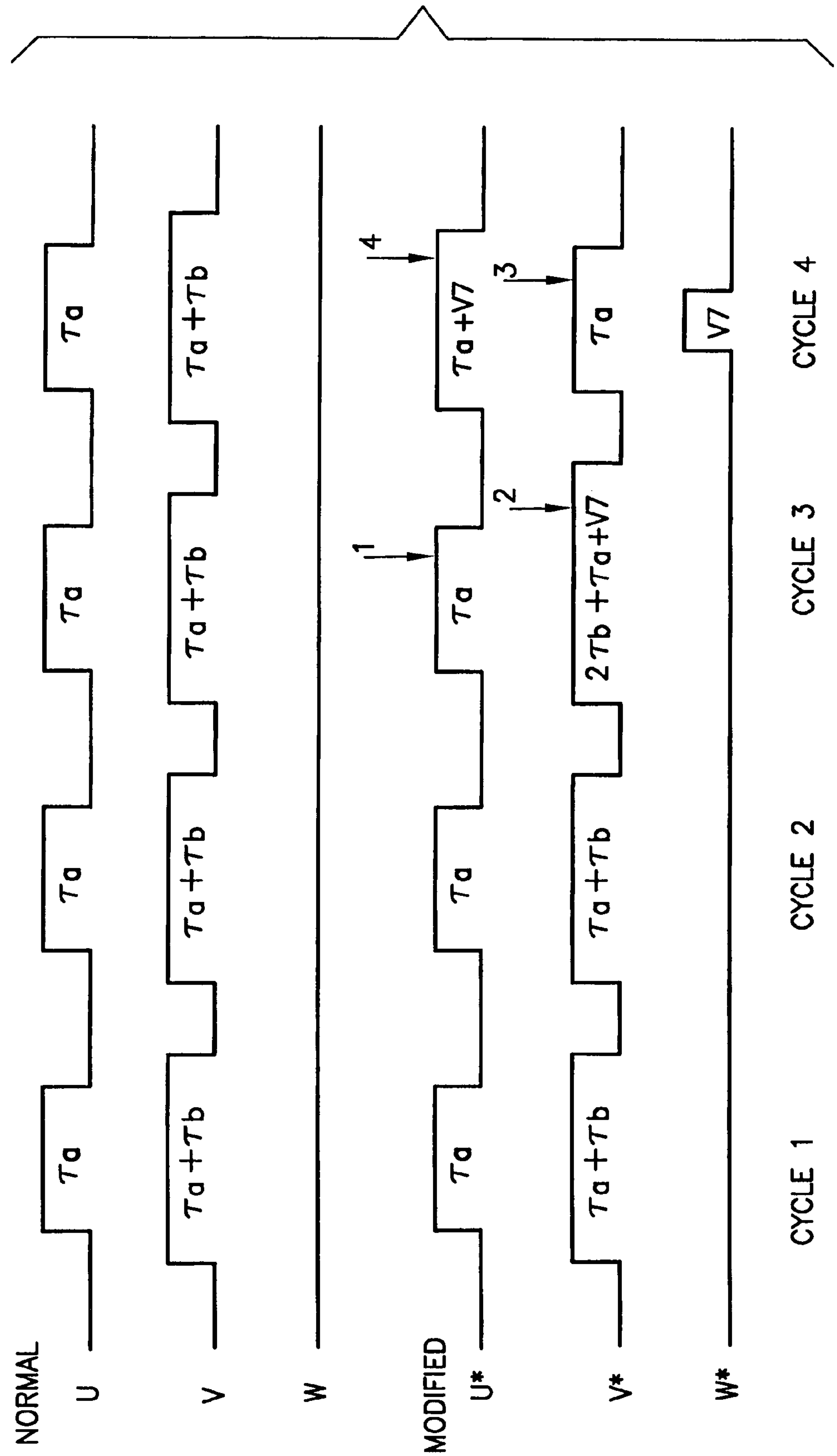

Referring now to FIG. 11, the sector 1 reconstruction near the sector 0-1 boundary is illustrated where 60≦$\sigma$<60+$\beta$.

The current reconstruction equations for this sector are as follows.

$$I_U=(I_4+I_1-I_2)/2$$

$$I_V=(I_2+I_3-I_4)/2$$

$$I_W=(-I_1-I_3)/2. \quad (2)$$

Note the modification of PWM phase U from τa to τa+V7 at measuring point 4 during cycle 4. Similarly, note the modification of phase V from τa+τb to 2τb+τa+V7 during cycle 3 to obtain measuring point 2. Phase V is also modified during cycle 4 to obtain measuring point 3 where the PWM pulse is of length τa. Phase W is modified to have a pulse during cycle 4 of duration V7 to offset the modifications to the other phases.

Figure 12:
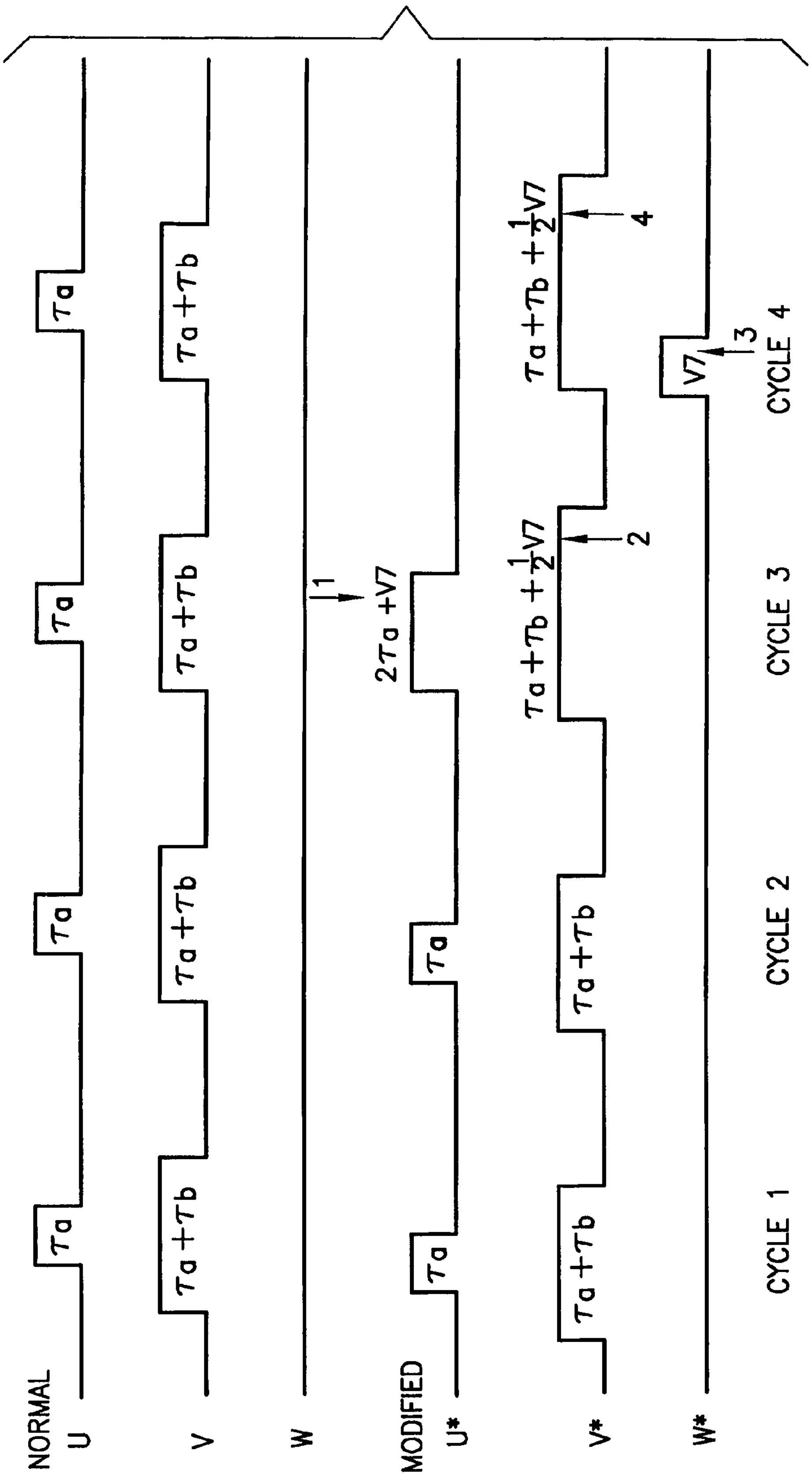

Referring now to FIG. 12, the sector 1 transition near the sector boundary 1-2 is illustrated where 120–$\alpha$≦$\sigma$<120. The current reconstruction equations are given as follows.

$$I_U=(-I_3+I_1-I_2)/2$$

$$I_V=(I_2+I_4)/2$$

$$I_W=(-I_1+I_3-I_4)/2 \quad (4)$$

Note the modifications to phase U from τa to 2τa+V7 during cycle 3 to obtain measuring point 1. Also note the elimination of a pulse during cycle 4 for phase U. Phase V is modified from τa+τb to τa+τb+½ V7 during cycle 3 to obtain measuring point 2. Phase V is also modified in the same way during cycle 4 to obtain measuring point 4. Phase W is also modified during cycle 4 to insert pulse V7 and obtain measuring point 3, while offsetting the modifications to phases U and V. Again, PWM cycles 1 and 2 are optional, while cycles 3 and 4 occur in pairs.

By modification of the PWM cycles as illustrated in the boundary conditions of FIGS. 9–12, motor phase current can be reconstructed from the DC link current measurement with better observability. The reconstructions for sector zero are similar to those for sectors 2 and 4, while the reconstructions for sector 1 are similar to those for sectors 3 and 5.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method for reconstructing motor phase currents in an inverter motor drive system by measuring DC link current, comprising:

supplying PWM control signals to inverter switches for switching current in the motor phases;

sampling DC bus current to obtain a DC bus current measurement;

modifying PWM control signals supplied to the inverter switches near sector boundaries to provide intervals where DC bus current may be sampled; and calculating motor phase currents based on the sampled DC bus currents measurements obtained during the intervals.

2. The method according to claim 1, further comprising modifying PWM control signals for a plurality of phases.

3. A space vector modulation control apparatus for an inverter drive system, comprising:

a processor for executing instructions to provide inverter gate drive control signals;

a feedback signal coupled to the processor and representative of DC bus current;

a set of instructions executable by the processor and arranged to provide space vector modulation control;

a sequence in the instructions for modifying a PWM cycle of the gate drive control signals when a reference voltage vector is near a state vector boundary; and another sequence of instructions for deriving motor phase currents based on the feedback signal to contribute to forming the gate drive control signals.

4. The apparatus according to claim 3, further comprising a sequence of instructions for modifying the gate drive control signals to permit the feedback signal to be correlated to motor phase currents.

5. The system according to claim 4, further comprising a current measuring device in the DC bus for generating the motor feedback signal.

6. A method for controlling a motor drive system using space vector modulation, comprising:

modifying PWM cycles when a reference vector is near sector boundaries;

obtaining a correlation between motor phase currents and DC bus currents when the PWM cycles are modified;

taking four or more current samples of the DC bus current when the PWM cycles are modified;

reconstructing motor phase currents from the current samples; and applying the reconstructed motor phase currents to the motor drive system control.

7. The method according to claim 6, wherein reconstructing motor phase currents is performed according to the equations:

$$I_U=(I_2+I_4)/2$$

$$I_V=(-I_3+I_1-I_2)/2$$

$$I_W=(-I_1+I_3-I_4)/2$$

where $I_1$ through $I_4$ represents the DC bus current samples.

8. The method according to claim 6, wherein reconstructing motor phase currents is performed according to the equations:

$$I_U=(I_2+I_3-I_4)/2$$

$$I_V=(I_4+I_1-I_2)/2$$

$$I_W=(-I_1-I_3)/2$$

where $I_1$ through $I_4$ represent the DC bus current samples.

9. The method according to claim 6, wherein reconstructing motor phase currents is performed according to the equations:

$$I_U=(I_4+I_1-I_2)/2$$

$$I_V=(I_2+I_3-I_4)/2$$

$$I_W=(-I_1-I_3)/2$$

where $I_1$ through $I_4$ represent the DC bus current samples.

10. The method according to claim 6, wherein reconstructing motor phase currents is performed according to the equations:

$$I_U=(-I_3+I_1-I_2)/2$$

$$I_V=(I_2+I_4)/2$$

$$I_W=(-I_1+I_3-I_4)/2.$$

where $I_1$ through $I_4$ represent the DC bus current samples.

11. The method according to claim 7, further comprising modifying the PWM cycles near the 0-5 boundary, 1-2 boundary and 3-4 boundary.

12. The method according to claim 8, further comprising modifying the PWM cycles near the 0-1 boundary, 2-3 boundary and 4-5 boundary.

13. The method according to claim 9, further comprising modifying the PWM cycles near the 0-1 boundary, 2-3 boundary and 4-5 boundary.

14. The method according to claim 10, further comprising modifying the PWM cycles near the 1-2 boundary, 3-4 boundary and 5-0 boundary.

* * * * *